United States Patent [19]

Anatra et al.

[11] Patent Number: 4,938,402
[45] Date of Patent: Jul. 3, 1990

[54] COUPON HOLDER

[75] Inventors: Heather E. Anatra; Victor Anatra, both of Guilford, Conn.

[73] Assignee: Anatra Enterprises, Inc., Guilford, Conn.

[21] Appl. No.: 335,817

[22] Filed: Apr. 10, 1989

[51] Int. Cl.$^5$ .............................................. B62B 5/00
[52] U.S. Cl. .............................. 224/277; 224/42.11; 224/42.46 R; 280/33.992
[58] Field of Search ......... 280/33.992, 304.5, DIG. 3, 280/DIG. 4; 224/273, 274, 277, 30 A, 36, 42.11, 42.46 R, 0.5

[56] References Cited

U.S. PATENT DOCUMENTS

| | | | |
|---|---|---|---|
| 2,290,099 | 7/1942 | Gill | 224/42.11 |
| 2,384,285 | 9/1945 | Deutsch | 224/42.46 R |
| 2,635,797 | 2/1953 | Siebert | 224/42.46 R |
| 2,813,602 | 11/1957 | MacArthur | 224/220 |
| 2,953,288 | 9/1960 | Peterson | 224/42.46 R |
| 3,409,193 | 11/1968 | Metcalf | 224/273 |
| 3,438,644 | 4/1969 | McMillan et al. | 224/277 |
| 3,717,188 | 2/1973 | Green | 150/1 |
| 4,450,994 | 5/1984 | Holland | 224/277 |
| 4,512,504 | 4/1985 | Owlett | 224/42.46 R |
| 4,643,280 | 2/1987 | Hensley | 190/11 |
| 4,702,402 | 10/1987 | Ferri | 224/277 |

Primary Examiner—Renee S. Luebke
Attorney, Agent, or Firm—Robert H. Montgomery

[57] ABSTRACT

A coupon holder adapted to be permanently mounted to the handle of shopping cart which comprise a one piece member of plastic material having two spaced apart coupon receptacles joined by an upper arcuate portion adapted to be received on the handle whereby the receptacles depend on either side of the handle, and at least one strap member attached extending between the receptacles, the strap member flexing the arcuate portion to cause it to secure the coupon holder to said handle.

12 Claims, 1 Drawing Sheet

COUPON HOLDER

FIELD OF THE INVENTION

This invention relates to coupon holders adapted to be permanently attached to the pushing handle of a shopping cart.

BACKGROUND OF THE INVENTION

At the present time, it is common practice for stores, particularly supermarkets, to offer lower prices on selected articles used as promotions by the various food suppliers. These coupons may be mailed to customers directly by the food suppliers or published in newspapers particularly weekend supplements. Additionally, the discount coupons may be placed in the supermarkets.

The use of the coupons which is for promotional purposes is due the fact that most products are now marked with what is called a bar code that is optically read at the checkout counter. Therefore, the coupons are redeemed at the checkout counter. The various retailers will have the prices of their products entered into a computer or other data processing device which will register the price of an article after the bar code is swept over the optical scanning device. For these reasons, the use of the rebate coupons have proliferated.

While the use of the coupons provides a shopper with some savings, there are limitations in the use of coupons. For example, depending upon the number and type of products for which the coupons are being used it is necessary for a shopper to handle a large number of different coupons on a given shopping trip. Different shoppers have different ways of organizing the coupons and in many cases the method of organization or lack of organization of the coupons will cause delays at the check out counter.

Various organizers or coupon holders have been proposed in the past. For example, U.S. Pat. No. 4,512,504 discloses a shopping organizer adapted to be attached to the handle of a shopping basket and includes pockets for receiving various devices such as coupons, shopping lists, calculators and other items useful for shopping.

U.S. Pat. No. 4,450,994 discloses a small filing case useful for putting in index dividers for organizing coupons. U.S. Pat. No. 4,702,402 also discloses a product coupon container which is attachable to a shopping cart across the rear and upper edge bars of the basket. U.S. Pat. No. 4,643,280 discloses a portable desk and article carrying structure for use with shopping carts.

The disclosures of all of these patents have one feature of commonality and that is that the shopper must bring it with them to the store and then carry it home. Additionally, the shopper must attach it to the handle or other portions of the shopping cart.

Accordingly, the present invention provides a new and improved coupon holder for use with a shopping cart which may be permanently attached thereto.

However, to permanently attach a coupon holder to the pushing handle of a shopping cart, requires consideration in view of the nesting of the shopping carts where one shopping cart, when nested, may extend into several other shopping carts due to the hinged nature of the back panel of the carts. As is well known, the back panel of the shopping carts is hinged in such a manner when another cart is pushed into it, the back panel will swing upwardly to permit nesting.

SUMMARY OF THE INVENTION

Briefly stated, a coupon holder embodying the invention comprises a modled one piece container of plastic material having two spaced apart coupon receptacles joined by an upper arcuate portion adapted to be received on the handle of the cart, whereby the receptacles depend on either side of the handle. At least one strap member is attached to the bottom walls of the receptacles, the strap member, when secured will flex the arcuate portion to cause it to engage the handle tightly and secure the holder to the handle, however, the holder may pivot about the handle when carts are nested and move upwardly on the handle in the channel defined between the arcuate portion and the bottom straps.

An object of this invention is to provide a new and improved coupon holder for permanent attachment to the handle of a shopping cart.

Another object of this invention is to provide a coupon holder for permanent attachment to the handle of a shopping cart which does not interfere with nesting of the carts.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENT OF THE INVENTION

Figure 1:
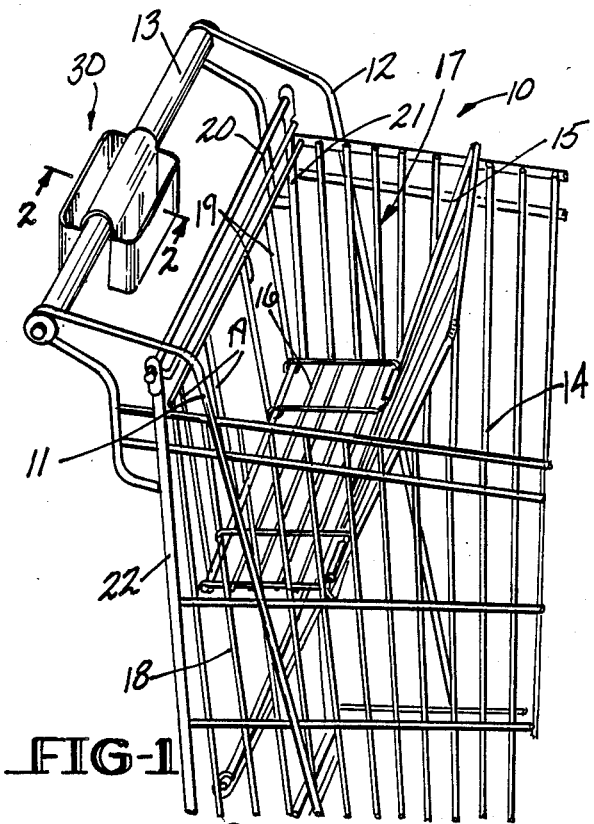
FIG. 1 is a perspective view of a portion of a typical shopping cart.
Figure 2:
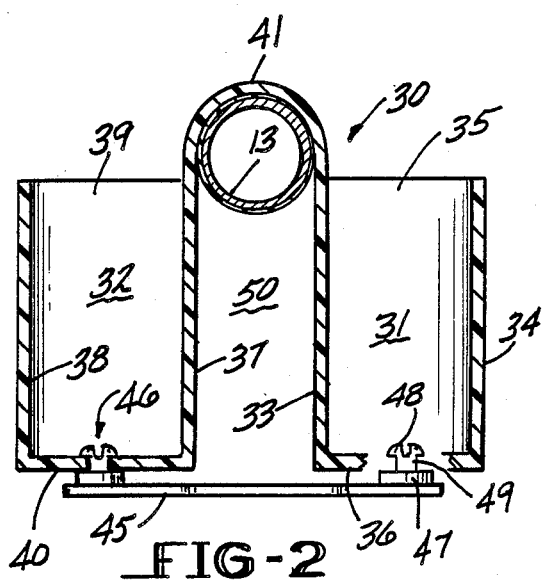
FIG. 2 is a view seen in the planes of lines 2—2 of FIG. 1.
Figure 3:
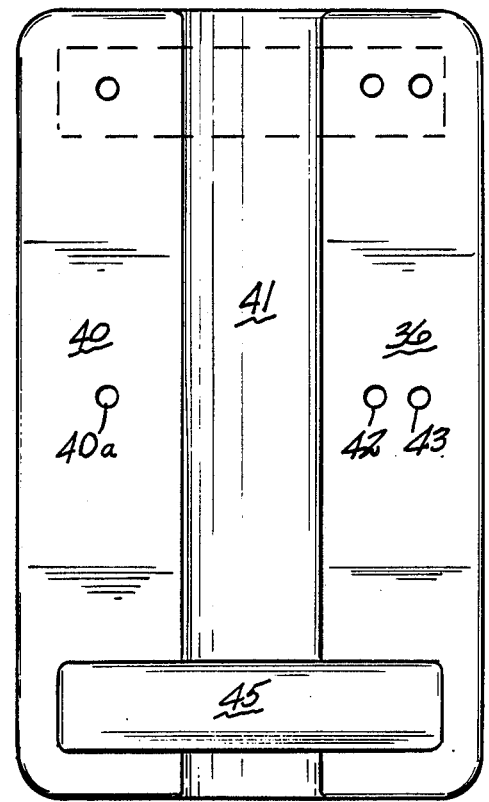
FIG. 3 is a bottom view of a coupon holder embodying the invention.

FIG. 1 exemplifies a typical shopping cart 10 having side members 11 and 12 which support a handle 13. The cart 10 has a main basket 14 and panels 15 and 16 which define a small basket 17 or a childs seat. The cart includes a rear panel comprising rods 19 which are attached to a shaft 20 which is pivotal with respect to upright members 21 and 22. The small basket 17 maybe collapsed and the rear panel 18 pivoted upwardly to nest carts for storage. Coupon holder 30 is a one piece member molded of plastic and defines two receptacles 31 and 32. Receptacle 31 is further defined by sidewalls 33 and 34, end walls 35 and a bottom wall 36. Receptacle 32 is defined by side walls 37 and 38, end wall 39 and bottom wall 40. An arcuate member 41 which is generally semi-circular in cross section joins side walls 33 and 37. Both receptacles are open topped.

Defined in bottom wall 40 are apertures 40a which are aligned with apertures 42 and 43 in bottom wall 36. These apertures permit attachment of straps 45. The straps have projections 46 at either end thereof which comprise a base portion 47, a head portion 48 and a shank 49. The resilient head portion is snapped through the apertures and the shank is received in the apertures 40a and 42 or 40a and 43 with the head portion overlying the edges of the aperture and securing the coupon holder 30 to the handle 13. This construction is essentially a plastic rivet. In fact, aluminum pop rivets with back washers may be utilized to secure strap 45 to the receptacle. Any other type of fastening implement may be used. The purpose of the two apertures 42 and 43 in bottom wall 36 is to permit adjustment in view of the size of handle 13. The arcuate portion 41 will flex about handle 13 and grip the handle. However, the coupon holder may still move with respect to the handle. If the handle is very small in diameter, spacer strips may be adhered to the under surface of portion 41 so that the coupon holder grips the handle.

A coupon holder embodying the invention is substantially rigid due to the molding process and is designed to be permanently attached to the shopping cart as hereinafter described.

The facing sidewalls 33 and 37 of the two receptacles, define a channel 50 which is closed at either end by arcuate portion 41 and straps 45. This construction permits the coupon holder to ride up and translate on handle 13 to a position as shown in FIG. 5 and allow carts to nest without damaging the coupon holders. Additionally, the coupon holder 30 is pivotal about handle 13 and may be pivoted to the position shown in FIG. 4 when the carts are to be nested. The holders 30 will move upwardly or pivot when struck by a cart as it is nested into a first cart. In most cart constructions it will be struck by cart panel 18 as cart panel 18 moves to a horizontal position.

Figure 4:
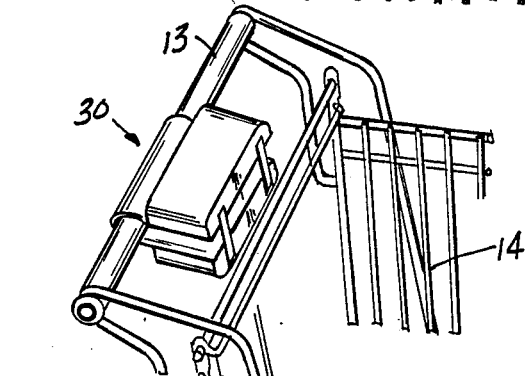
FIGS. 4 and 5 are perspective views of a portion of a typical shopping cart showing how the coupon holder may move to permit nesting of carts.
Figure 5:
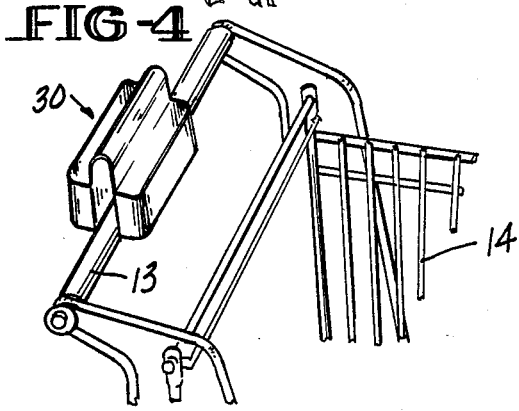

In FIGS. 4 and 5 the small basket has not been illustrated for purposes of clarity.

The number of straps may range from 1 to 3 as decided by the supermarket. Generally two will be used. The straps could also be attached to the end walls 35 and 39 of the receptacles, however this would tend to limit the dimension of channel 50 and the movement that the coupon holder could have with respect to handle 13.

The construction of the coupon holder provides a convenient receptacle for shoppers for the carrying of coupons which the shopper brings to the store as well as others which may be available within the store and is quite compact.

A typical coupon holder embodying the invention has receptacle sidewalls about five and three quarter inches long, two inches deep and one and one-quarter inch wide. The spacing across channel 50 is one and one-eigth inch, and arcuate portion 41 is defined on a radius of one half that dimension.

It may thus be seen that the objects of the invention set forth, as well as those made apparent from the foregoing description, are efficiently attained. While a preferred embodiment of the invention has been set forth for purposes of disclosure, modification to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

What is claimed is:

1. For use with a shopping cart having a horizontal pushing handle extending rearwardly therefrom, a coupon holder molded in one piece of rigid plastic material and having two spaced apart open top coupon receptacles joined by an upper arcuate portion adapted to be received on said handle whereby said receptacles depend on either side of said handle, each of said receptacles being defined by end walls and a bottom wall, and further including at least one strap member attached to said receptacles, said strap member flexing said arcuate portion to cause it to engage said handle and secure said holder to said handle.

2. The coupon holder of claim 1 where said strap member is attached to the bottom walls of said receptacles.

3. The coupon holder of claim 2 where the bottom walls of said receptacles have apertures therein and said strap has projections which lock into said apertures.

4. The coupon holder of claim 1 wherein said receptacles define a channel therebetween subtended by said arcuate portion and said strap, and said holder is movable on said handle in said channel.

5. The coupon holder of claim 1 wherein said holder may pivot on said handle.

6. For use with a shopping cart having a horizontal pushing handle extending rearwardly therefrom, a pair of open top receptacles, each of said receptacles having side and end walls and a bottom wall, said receptacles having facing side walls, said facing side walls being joined by an upwardly extending arcuate portion, said arcuate portion having some flexibility and being adapted to receive the cart handle between said receptacles, and further including at least one strap member extending between the bottom walls of said receptacles and flexing said arcuate portion to cause it to grip said handle and secure said holder to said cart.

7. The coupon holder of claim 6 where the bottom walls of said receptacles have apertures therein and said strap has projections which lock into said apertures.

8. The coupon holder of claim 6 wherein said receptacles define a channel therebetween subtended by said arcuate portion and said strap, and said holder is movable on said handle in said channel.

9. The coupon holder of claim 6 wherein said holder may pivot on said handle.

10. A coupon holder for a shopping cart having a horizontal pushing handle, said coupon holder comprising two open top coupon receptacles each having side and end walls, and a bottom wall joined by an upper arcuate portion adapted to be received on the handle whereby said receptacles depend on either side of said handle, said coupon holder receptacles having facing side walls defining a channel, said receptacles and said arcuate portion being molded in one piece of a substantially rigid plastic, said arcuate portion having some flexibility and receiving the handle between the receptacles, and means joining said receptacles and flexing said arcuate portion about the handle and together with said arcuate portion subtending the channel whereby said coupon holder may rotate on the handle and also translate on the handle.

11. A coupon holder for a shopping cart having a horizontal pushing handle, said coupon holder comprising two open top coupon receptacles each having side walls and a bottom wall joined by an upper arcuate portion adapted to be received on the handle whereby said receptacles depend on either side of said handle, said coupon holder receptacles having facing side walls defining a channel, said receptacles and said arcuate portion being molded of a substantially rigid plastic, said arcuate portion having some flexibility and receiving the handle between the receptacles, and means joining said receptacles and flexing said arcuate portion about the handle and together with said arcuate portion subtending the channel whereby said coupon holder may rotate on the handle and also translate on the handle.

12. The coupon holder of claim 11 wherein said joining means extend between and are attached to each of said coupon receptacles and cause said arcuate portion to grip the handle.

* * * * *